(12) United States Patent
Li et al.

(10) Patent No.: US 10,375,422 B1
(45) Date of Patent: Aug. 6, 2019

(54) METHOD AND APPARATUS FOR MOTION FIELD BASED TREE SPLITTING

(71) Applicant: TENCENT AMERICA LLC, Palo Alto, CA (US)

(72) Inventors: Xiang Li, San Diego, CA (US); Xin Zhao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/232,592

(22) Filed: Dec. 26, 2018

Related U.S. Application Data

(60) Provisional application No. 62/650,951, filed on Mar. 30, 2018.

(51) Int. Cl.
  *H04N 19/176* (2014.01)
  *H04N 19/139* (2014.01)
  *H04N 19/96* (2014.01)

(52) U.S. Cl.
  CPC .......... *H04N 19/96* (2014.11); *H04N 19/139* (2014.11)

(58) Field of Classification Search
  CPC .............................. H04N 19/96; H04N 19/139
  See application file for complete search history.

(56) References Cited

U.S. PATENT DOCUMENTS

| | | | |
|---|---|---|---|
| 9,955,186 B2* | 4/2018 | Chon | H04N 19/593 |
| 10,212,444 B2* | 2/2019 | Li | H04N 19/44 |
| 2016/0134876 A1* | 5/2016 | Chong | H04N 19/105 |
| | | | 375/240.02 |
| 2017/0208336 A1* | 7/2017 | Li | H04N 19/44 |
| 2018/0070110 A1* | 3/2018 | Chuang | H04N 19/96 |
| 2018/0241998 A1* | 8/2018 | Chen | H04N 19/139 |

\* cited by examiner

*Primary Examiner* — Tsion B Owens
(74) *Attorney, Agent, or Firm* — Sughrue Mion, PLLC

(57) ABSTRACT

A method and apparatus for encoding or decoding a video sequence includes partitioning the video sequence into coding tree units, each coding tree unit including at least one coding tree block and each coding tree block including at least one coding block, determining the motion field of the at least one coding block, determining whether the motion field of the at least one coding block is homogenous or heterogeneous, and determining whether to signal a further partition of the at least one coding block based on the determination of whether the motion field of the at least one coding block is homogenous or heterogeneous.

20 Claims, 9 Drawing Sheets

Partition a video sequence into coding tree units, each coding tree unit including at least one coding tree block and each coding tree block including at least one coding block — 810

Determine the motion field of the at least one coding block — 820

Determine whether the motion field of the at least one coding block is homogenous or heterogeneous — 830

Determine whether to signal a further partition of the at least one coding block based on the determination of whether the motion field of the at least one coding block is homogenous or heterogeneous — 840

FIG. 1
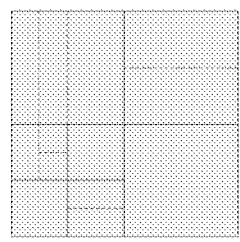 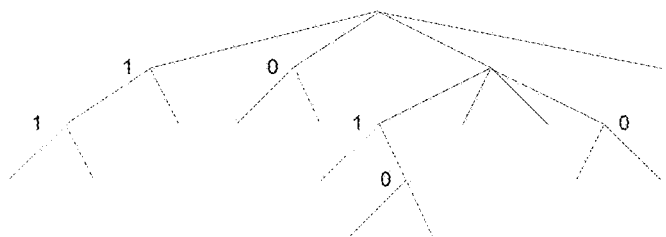
(a) (b)

FIG. 6 Decoder 510

FIG. 7    Encoder 503

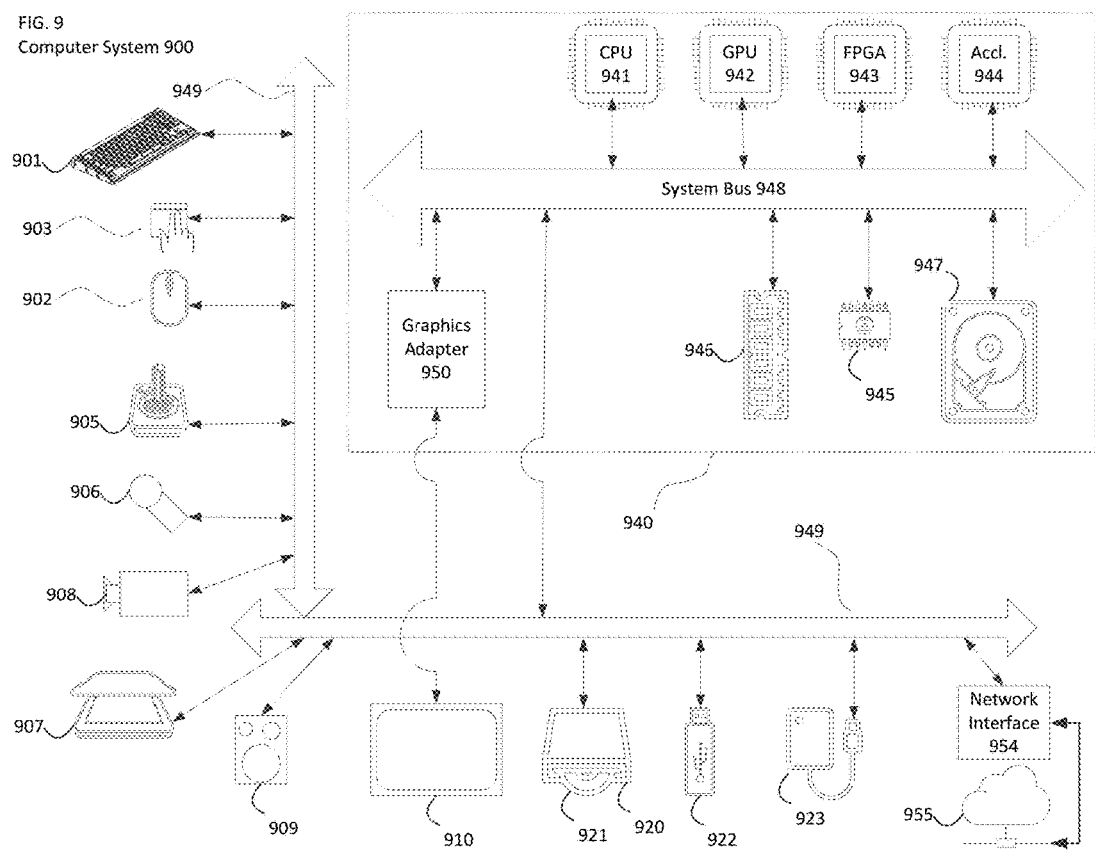

METHOD AND APPARATUS FOR MOTION FIELD BASED TREE SPLITTING

CROSS-REFERENCE TO RELATED APPLICATION

This application claims priority under 35 U.S.C. § 119 from U.S. Provisional Application No. 62/650,951 filed on Mar. 30, 2018 in the U.S. Patent & Trademark Office, the disclosure of which is incorporated herein by reference in its entirety.

FIELD

Methods and apparatuses consistent with embodiments relate to video processing, and more particularly, advanced block partitioning in hybrid video coding beyond High Efficiency Video Encoding, including tree splitting for flexible tree structures.

BACKGROUND

Recently, the Video Coding Experts Group (VCEG) of the ITU Telecommunication Standardization Sector (ITU-T), a sector of the International Telecommunication Union (ITU), and the ISO/IEC MPEG (JTC 1/SC 29/WG 11), a standardization subcommittee of the Joint Technical Committee ISO/IEC JTC 1 of the International Organization for Standardization (ISO) and the International Electrotechnical Commission (IEC), published the H.265/High Efficiency Video Coding (HEVC) standard in 2013 (version 1). This standard was updated in 2014 to version 2, in 2015 to version 3, and in 2016 to version 4.

Since then these groups have studied the need for standardization of future video coding technology with a compression capability that significantly exceeds that of the HEVC standard and its updates. These groups have been working together in this effort in a joint collaboration known as the Joint Video Exploration Team (JVET) to evaluate compression technology designs proposed by experts in this field. A Joint Exploration Model (JEM) has been developed by JVET to explore video coding technologies beyond the capability of H.265 HEVC. The current and latest version of JEM is JEM-7.0.

In H.265 HEVC, a coding tree unit (CTU), which is the basic processing unit (logical unit) of the standard, is split into coding units (CUs) (also known as coding blocks) by way of a quad-tree structure denoted as a coding tree so as to adapt to various local characteristics.

The decision whether to code a picture area of a video using either inter-picture (temporal) or intra-picture (spatial) prediction is made at the CU level. Each CU can be further split into, for example, one, two, or four prediction units (PUs) according to a PU splitting type. For example, inside one PU, the same prediction process may be applied, and relevant information may be transmitted to a decoder on a PU basis.

After obtaining a residual block by applying the prediction process based on the PU splitting type, a CU can be partitioned into transform units (TUs) according to another quadtree structure similar to the coding tree for the CU.

One feature of the H.265 HEVC standard is that it includes multiple partition concepts including the CU, the PU, and the TU. However, in the signal-to-noise ratio (SNR) standard, a CU and a TU can only be square shaped, while a PU may be square shaped or rectangular shaped, at least for an inter-predicted block.

Recently, it has been proposed to allow rectangular shaped PUs for intra-prediction and transform thereof. However, this proposal was not adopted in the H.265 HEVC standard, but rather only was extended to be used in JEM.

In the H.265 HEVC standard, at the picture boundary of a picture area, implicit quad-tree splits are imposed so that a block will keep quad-tree splitting until the size fits the picture boundary.

In JEM however, a different type of splitting structure, a Quad-tree-Binary-Tree (QTBT), was developed which unifies the concepts of the CU, PU, and TU. This QTBT supports more flexibility for CU partition shapes. For example, according to a QTBT block structure, a CU can have either a square shape or rectangular shape. As is shown in FIGS. 1A and 1B, a CTU is first partitioned by a quadtree structure. Then quadtree leaf nodes thereof are further partitioned by a binary tree structure.

In the binary tree splitting there are two splitting types: symmetric horizontal splitting and symmetric vertical splitting. Here, the binary tree leaf nodes CUs, and segmentation thereof are used for prediction and transform processing without further partitioning. Thus, the CU, PU, and TU can have the same block size in the QTBT coding block structure.

In the JEM, a CU may consist of coding blocks CBs of different color components. For example, one CU may contain one luma coding block CB and two chroma coding blocks CBs, in the case of P and B slices of a 4:2:0 chroma format; and may consists of a single component, for example, one CU may contain only one luma coding block CB or just two chroma CBs, in the case of I slices.

Parameters of the afore-described QTBT partitioning scheme may be defined as follows:

CTU size: the root node size of a QTBT, (similar to H.265 HEVC);

MaxQTDepth: the maximum allowed quad-tree depth;

MinQTSize: the minimum allowed quadtree leaf node size;

MaxBTSize: the maximum allowed binary tree root node size;

MaxBTDepth: the maximum allowed binary tree depth;

MinBTSize: the minimum allowed binary tree leaf node size.

In one example of the QTBT partitioning structure, the CTU size is set as 128×128 luma samples with two corresponding 64×64 blocks of chroma samples; the MinQTSize is set as 16×16; the MaxBTSize is set as 64×64; the MinBTSize (for both height and width) is set as 4×4; and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree which has a binary tree depth of 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In JEM, the maximum CTU size is 256×256 luma samples.

FIG. 1A illustrates an example of block partitioning using QTBT, and FIG. 1B illustrates the corresponding tree representation. In these Figures, the solid lines indicate quadtree splitting and the dotted lines indicate binary tree splitting. In each splitting node (i.e., non-leaf) of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, in the QTBT scheme, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three color components.

In H.265 HEVC, inter-prediction for small blocks is restricted to reduce the memory access of motion compensation, such that bi-prediction is not supported for 4×8 and 8×4 blocks, and inter-prediction is not supported for 4×4 blocks. In the QTBT of JEM, these restrictions are removed.

Next, a Multi-type-tree (MTT) structure will be described. A MTT is a more flexible tree structure than QTBT. In MTT, tree types other than quad-trees and binary-trees are supported. Horizontal and vertical center-side triple-trees are introduced, as shown in FIGS. 2D and 2E.

In a MTT scheme, there are two levels of trees, region trees (e.g. quad-trees) and prediction trees (e.g. binary-trees or triple-trees). Here, a CTU is first partitioned by a region tree (RT). A RT leaf may then be further split with a prediction tree (PT). A PT node may also be further split with a PT until a max PT depth is reached. After entering a PT, an RT (e.g. quad-tree) cannot be further used. Here, a PT leaf is the basic coding unit, but will still be referred to as a CU for convenience. This CU cannot be further split. Prediction and transform are both applied on the CU in the same way as JEM-3 or QTBT.

Some benefits of triple-tree partitioning are: (1) Complement to quad-tree and binary-tree partitioning. Here, triple-tree partitioning is able to capture objects which are located in a block center while quad-trees and binary-trees are always splitting along a block center. And (2) the height and width of the partitions of the proposed triple trees are always in a power of 2, so that no additional transforms are needed.

The design of a two-level tree may be motivated by complexity reduction. Thus, the complexity of traversing of a tree is TAD, where T denotes the number of split types, and D is the depth of tree. With the design of a two level tree and restriction of the first level is quad-tree only (reduce the number of T at certain levels), the complexity is reduced a lot while keeping a reasonable performance.

Next, Asymmetric Coding Units (ACU) in QTBT will be described. To further improve the coding efficiency on top of QTBT, an asymmetric binary tree has been proposed. As shown in FIG. 3, a CU with size S is divided into 2 sub-CUs with sizes S/4 and 3S/4, either in the horizontal or in the vertical direction. As an example, CU sizes of 12 and 24 are used. However, other sizes may also be used, such as 6 and 48.

One issue with ACUs in a QTBT scheme is that efficiency may be reduced if a width/height of a block is not in a power of 2. For example, transforms with a size such as 12 and 24 need to be supported. Accordingly, Special handling may also be needed when splitting a block with width/height being not a power of 2.

A Flexible tree structure will now be described. As described in U.S. Provisional Pat. No. 62/639,989, a flexible tree structure was proposed, in which a "split-to-square" scheme was introduced to replace quad-tree splits so as to handle more generic cases such as non-square CTUs.

Motion field information in H.265 HEVC will now be described. In H.265 HEVC, temporal motion vector prediction (TMVP) may be employed to improve the efficiency of motion vector prediction. That is, motion field of a reference frame may be stored in a decoded picture buffer (DPB) in addition to the reconstructed pixels of the reference frame.

Interpolated motion field will now be described. With a coding mode based on frame-rate up-conversion, interpolated (or extrapolated) motion field may be derived for the current frame before coding the current frame. Such derived motion information may be used in block level motion vector prediction or derivation.

Despite the afore-described advances in video coding, there exist problems in the current state of the art. For example, in advanced block partitioning methods, such as the multi-type tree, no motion information is considered during a tree split. This is not efficient since block partitioning typically correlates with motion fields, and pixels within one partition usually prefer a same motion.

Summary

According to an aspect of the disclosure, a method for encoding a video sequence comprises partitioning the video sequence into coding tree units, each coding tree unit including at least one coding tree block and each coding tree block including at least one coding block, determining the motion field of the at least one coding block, determining whether the motion field of the at least one coding block is homogenous or heterogeneous, and determining whether to signal a further partition of the at least one coding block based on the determination of whether the motion field of the at least one coding block is homogenous or heterogeneous.

According to an aspect of the disclosure, the method may also comprise partitioning the at least one coding block when it is determined that the motion field is heterogeneous.

According to an aspect of the disclosure, the method may also comprise not signaling in bit stream partitioning of the at least one coding block.

According to an aspect of the disclosure, the method may also comprise leaving as non-partitioned the at least one coding block when it is determined that the motion field is homogeneous.

According to an aspect of the disclosure, the method may also comprise not signaling in bit stream non-partitioning of the at least one coding block.

According to an aspect of the disclosure, the method may also comprise partitioning the at least one coding block using a tree type split such that sub-blocks obtained via the partitioning have the most homogeneous motion field among all available splitting types, wherein information on how to split the current block is derived (e.g. not signaled).

According to an aspect of the disclosure, the method may also comprise determining split types for partitioning the at least one coding block which result in relatively more heterogeneous motion fields than other available splitting types, and leaving as non-partitioned the at least one coding block by the split types which would result in relatively more heterogeneous motion fields so as to reduce signaling costs.

According to an aspect of the disclosure, the method may also comprise not checking split types for partitioning the at least one coding block which would lead to sub-blocks with more heterogeneous determined/derived motion fields than other split types for partitioning the at least one coding block.

According to an aspect of the disclosure, the method may also comprise not checking split types for partitioning the at least one coding block when it is determined that the determined/derived motion field is homogeneous.

According to an aspect of the disclosure, the method may also comprise determining whether to signal the further partition of the at least one coding block based on the condition that the at least one coding block is larger than a predetermined threshold.

According to an aspect of the disclosure, the method may also comprise determining/deriving the size of the coding tree units based on the motion field.

According to an aspect of the disclosure, the method may also comprise determining/deriving the maximum depth of a further partition of the at least one coding block based on a ranking of how homogeneous/heterogeneous the motion field is for the coding block.

According to an aspect of the disclosure, the method may also comprise, based on a ranking of how homogeneous/heterogeneous the determined/derived motion field is for a block region (e.g., 256×256, or 512×512), applying different CTU sizes within the block region.

According to an aspect of the disclosure, the afore-described methods may be applied differently for different block sizes.

According to an aspect of the disclosure, the method may also comprise determining a context-adaptive binary arithmetic coding (CABAC) context for entropy coding flags signaled for indicating the further partition of the at least one coding block.

According to an aspect of the disclosure, a method for encoding a video sequence comprises partitioning the video sequence into coding tree units, each coding tree unit including at least one coding tree block and each coding tree block including at least one coding block, determining/deriving the motion field of the at least one coding block, using information on the determined/derived motion field as a context or additional context in an entropy coding process when signaling a coding block split.

According to an aspect of the disclosure, the method may further comprise using an additional context-adaptive binary arithmetic coding (CABAC) context to signal coding block split information if the information on the determined/derived motion field is homogeneous.

According to an aspect of the disclosure, the method may also comprise using an additional CABAC context to signal coding block split information if the information on the determined/derived motion field is heterogeneous.

According to an aspect of the disclosure, the method may also comprise using additional contexts to signal coding block split information based on a ranking of how homogeneous/heterogeneous the determined/derived motion field is for the coding block.

According to an aspect of the disclosure a device for encoding a video sequence comprises: at least one memory configured to store program code; at least one processor configured to read the program code and operate as instructed by the program code, the program code including: first partitioning code configured to cause the at least one processor to partition the video sequence into coding tree units, each coding tree unit including at least one coding tree block and each coding tree block including at least one coding block, first determining code configured to cause the at least one processor to determine the motion field of the at least one coding block, second determining code configured to cause the at least one processor to determine whether the motion field of the at least one coding block is homogenous or heterogeneous, and third determining code configured to cause the at least one processor to determine whether to signal a further partition of the at least one coding block based on the determination of whether the motion field of the at least one coding block is homogenous or heterogeneous.

According to an aspect of the disclosure the device may also comprise second partitioning code configured to cause the at least one processor to partition the at least one coding block when it is determined that the motion field is heterogeneous.

According to an aspect of the disclosure the device may have the second partitioning code configured to not signal in bit stream partitioning of the at least one coding block.

According to an aspect of the disclosure the device may have the third determining code configured to signal a non-partitioning of the at least one coding block when it is determined that the motion field is homogeneous.

According to an aspect of the disclosure the device may also comprise second partitioning code configured to cause the at least one processor to partition the at least one coding block using a tree type split such that sub-blocks obtained via the second partitioning code have the most homogeneous motion field among all available splitting types, wherein information on how to split the current block is derived.

According to an aspect of the disclosure the device may also comprise fourth determining code configured to cause the at least one processor to determine split types for partitioning the at least one coding block which result in relatively more heterogeneous motion fields than other available splitting types, and second partitioning code configured to cause the at least one processor to leave as non-partitioned the at least one coding block by the split types which would result in relatively more heterogeneous motion fields so as to reduce signaling costs.

According to an aspect of the disclosure the device may also comprise fourth determining code configured to cause the at least one processor to determine whether to signal the further partition of the at least one coding block when the at least one coding block is larger than a predetermined threshold.

According to an aspect of the disclosure the device may also comprise fourth determining code configured to cause the at least one processor to determine the size of the coding tree units based on the motion field.

According to an aspect of the disclosure the device may also comprise first deriving code configured to cause the at least one processor to derive the maximum depth of a further partition of the at least one coding block based on a ranking of how homogeneous/heterogeneous the motion field is for the coding block.

According to an aspect of the disclosure a non-transitory computer-readable medium stores instructions, the instructions comprising: one or more instructions that, when executed by one or more processors of a device, cause the one or more processors to: partition a video sequence into coding tree units, each coding tree unit including at least one coding tree block and each coding tree block including at least one coding block, determine the motion field of the at least one coding block, determine whether the motion field of the at least one coding block is homogenous or heterogeneous, and determine whether to signal a further partition of the at least one coding block based on the determination of whether the motion field of the at least one coding block is homogenous or heterogeneous.

While the afore described methods, devices, and non-transitory computer-readable mediums have been described individually, these descriptions are not intended to suggest any limitation as to the scope of use or functionality thereof. Indeed these methods, devices, and non-transitory computer-readable mediums may be combined in other aspects of the disclosure.

BRIEF DESCRIPTION OF THE DRAWINGS

Further features, the nature, and various advantages of the disclosed subject matter will be more apparent from the following detailed description and the accompanying drawings in which:

FIG. 1 is a diagram of a partitioned coding tree unit in accordance with an embodiment;

FIG. 9 is a diagram of a computer system in accordance with an embodiment.

PROBLEM TO BE SOLVED

Some implementations described herein permit the consideration of motion field information in block partitioning methods during tree splits which result in bit rate reduction, and performance increase, among other technical benefits.

DETAILED DESCRIPTION

Figure 2:
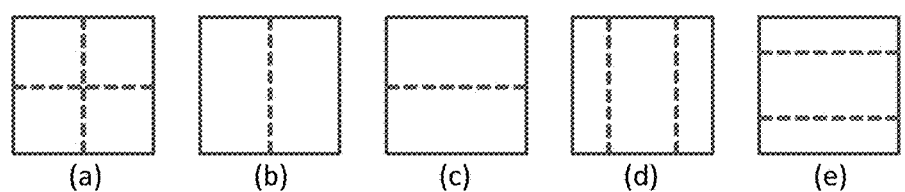
FIG. 2 is a diagram of a coding tree unit in accordance with an embodiment.
Figure 3:
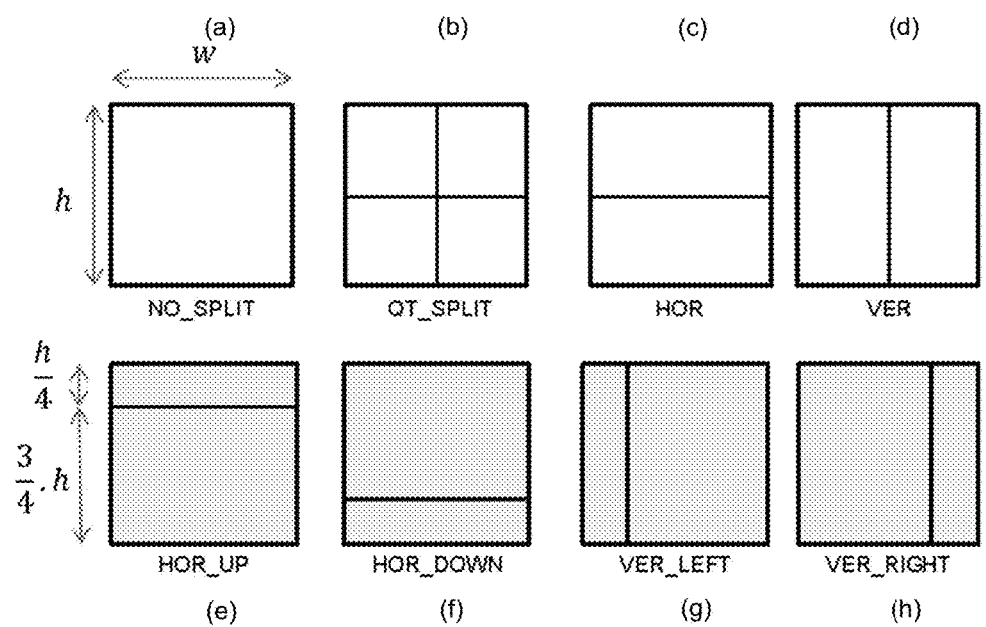
FIG. 3 is a diagram of a partitioned coding unit in accordance with an embodiment.
Figure 4:
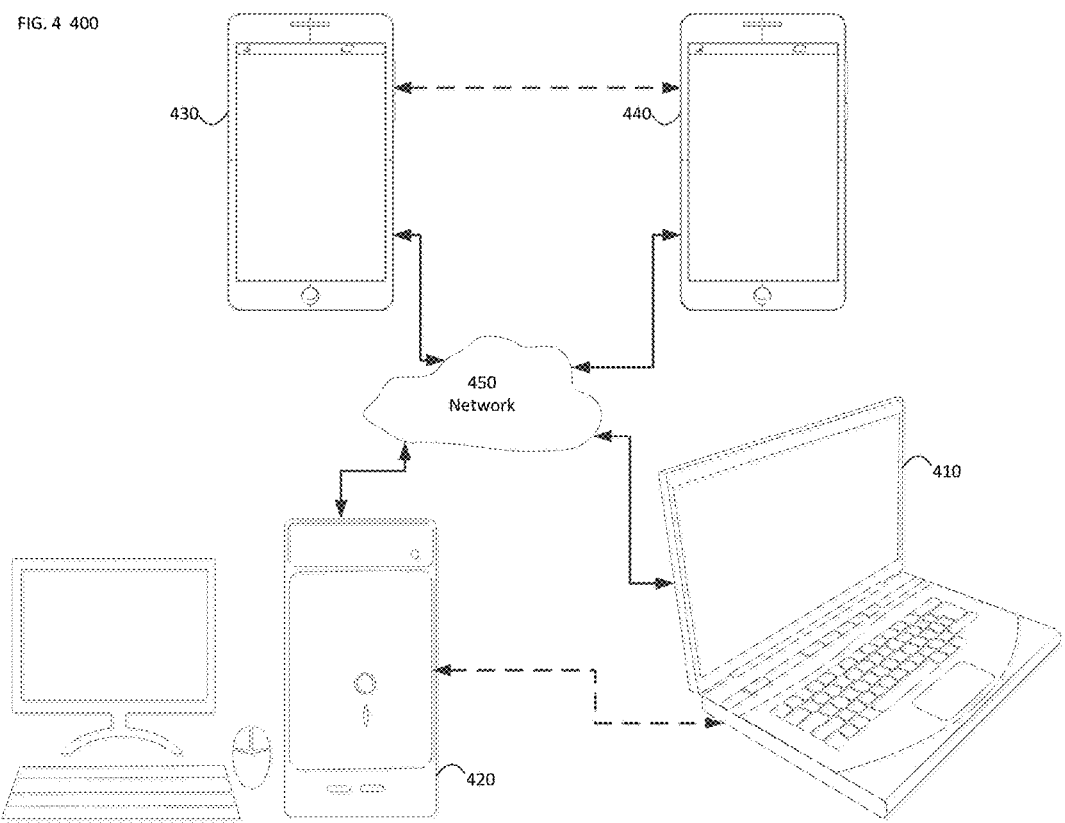
FIG. 4 is a simplified block diagram of a communication system in accordance with an embodiment.

FIG. 4 illustrates a simplified block diagram of a communication system (400) according to an embodiment of the present disclosure. The communication system (400) may include at least two terminals (410-420) interconnected via a network (450). For unidirectional transmission of data, a first terminal (410) may code video data at a local location for transmission to the other terminal (420) via the network (450). The second terminal (420) may receive the coded video data of the other terminal from the network (450), decode the coded data and display the recovered video data. Unidirectional data transmission may be common in media serving applications and the like.

FIG. 4 illustrates a second pair of terminals (430, 440) provided to support bidirectional transmission of coded video that may occur, for example, during videoconferencing. For bidirectional transmission of data, each terminal (430, 440) may code video data captured at a local location for transmission to the other terminal via the network (450). Each terminal (430, 440) also may receive the coded video data transmitted by the other terminal, may decode the coded data and may display the recovered video data at a local display device.

In FIG. 4, the terminals (410-440) may be illustrated as servers, personal computers and smart phones but the principles of the present disclosure are not so limited. Embodiments of the present disclosure find application with laptop computers, tablet computers, media players and/or dedicated video conferencing equipment. The network (450) represents any number of networks that convey coded video data among the terminals (410-440), including for example wireline and/or wireless communication networks. The communication network (450) may exchange data in circuit-switched and/or packet-switched channels. Representative networks include telecommunications networks, local area networks, wide area networks and/or the Internet. For the purposes of the present discussion, the architecture and topology of the network (450) may be immaterial to the operation of the present disclosure unless explained herein below.

Figure 5:
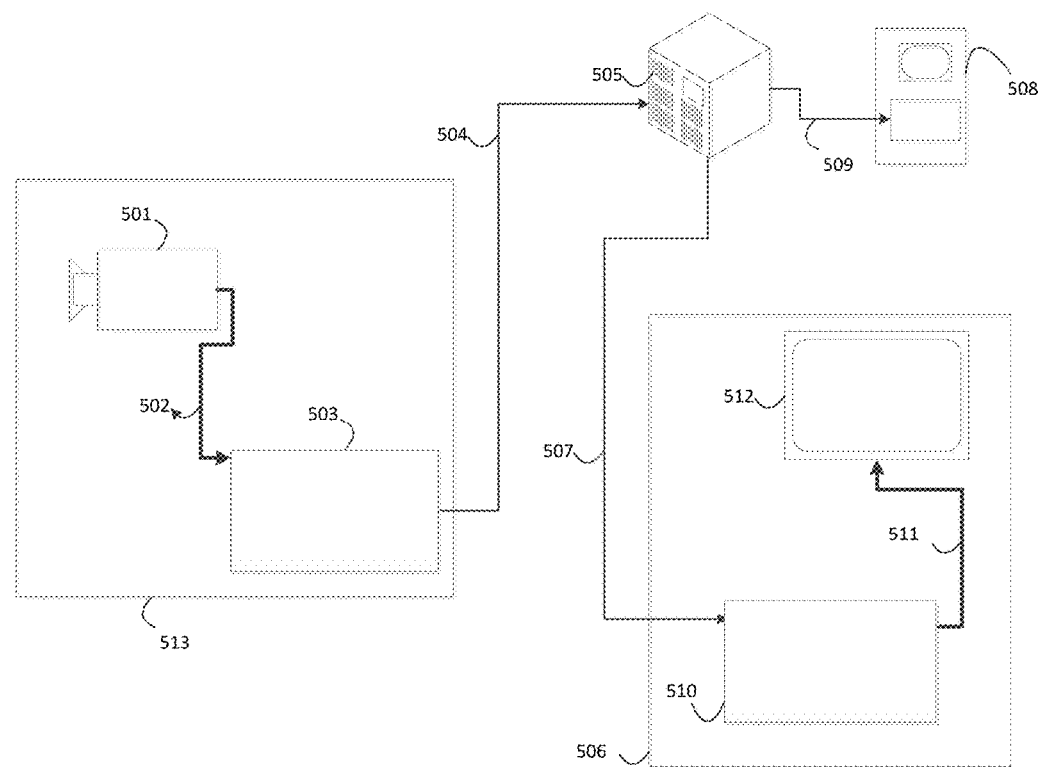
FIG. 5 is a diagram of a streaming environment in accordance with an embodiment.

FIG. 5 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (513), that can include a video source (501), for example a digital camera, creating, for example, an uncompressed video sample stream (502). That sample stream (502), depicted as a bold line to emphasize a high data volume when compared to encoded video bitstreams, can be processed by an encoder (503) coupled to the camera (501). The encoder (503) can include hardware, software, or a combination thereof to enable or implement aspects of the disclosed subject matter as described in more detail below. The encoded video bitstream (504), depicted as a thin line to emphasize the lower data volume when compared to the sample stream, can be stored on a streaming server (505) for future use. One or more streaming clients (506, 508) can access the streaming server (505) to retrieve copies (507, 509) of the encoded video bitstream (504). A client (506) can include a video decoder (510) which decodes the incoming copy of the encoded video bitstream (507) and creates an outgoing video sample stream (511) that can be rendered on a display (512) or other rendering device (not depicted). In some streaming systems, the video bitstreams (504, 507, 509) can be encoded according to certain video coding/compression standards. Examples of those standards include H.265 HEVC. Under development is a video coding standard informally known as Versatile Video Coding (VVC). The disclosed subject matter may be used in the context of VVC.

Figure 6:
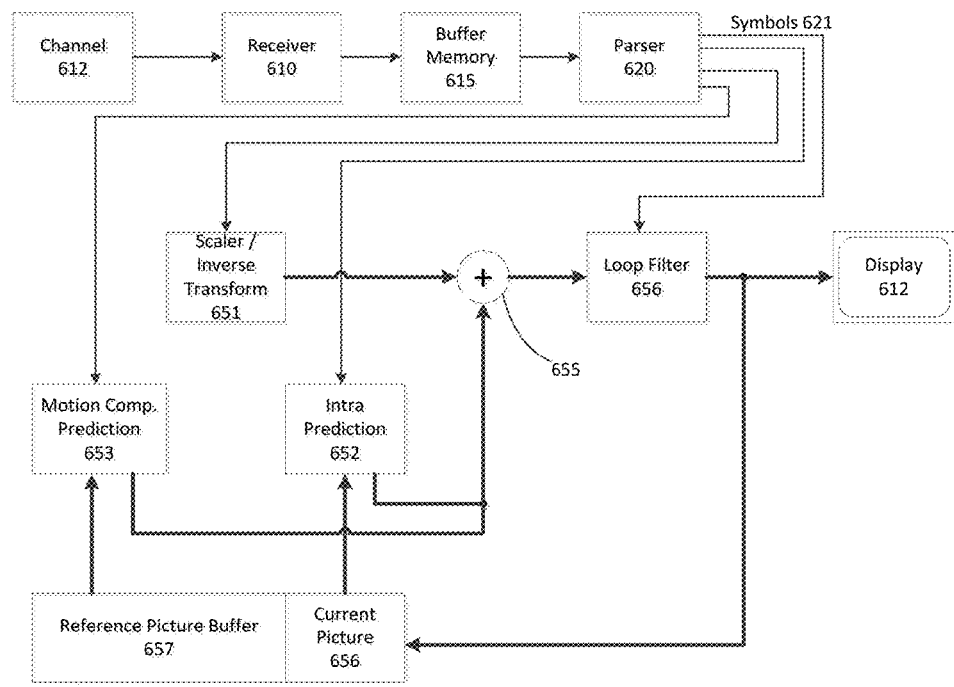
FIG. 6 is a block diagram of a video decoder in accordance with an embodiment.

FIG. 6 may be a functional block diagram of a video decoder (510) according to an embodiment of the present invention.

A receiver (610) may receive one or more codec video sequences to be decoded by the decoder (610); in the same or another embodiment, one coded video sequence at a time, where the decoding of each coded video sequence is independent from other coded video sequences. The coded video sequence may be received from a channel (612), which may be a hardware/software link to a storage device which stores the encoded video data. The receiver (610) may receive the encoded video data with other data, for example, coded audio data and/or ancillary data streams, that may be forwarded to their respective using entities (not depicted). The receiver (610) may separate the coded video sequence from the other data. To combat network jitter, a buffer memory (615) may be coupled in between receiver (610) and entropy decoder/parser (620) ("parser" henceforth). When receiver (610) is receiving data from a store/forward device of sufficient bandwidth and controllability, or from an isosychronous network, the buffer (615) may not be needed, or can be small. For use on best effort packet networks such as the Internet, the buffer (615) may be required, can be comparatively large and can advantageously of adaptive size.

The video decoder (510) may include a parser (620) to reconstruct symbols (621) from the entropy coded video sequence. Categories of those symbols include information used to manage operation of the decoder (510), and potentially information to control a rendering device such as a display (512) that is not an integral part of the decoder but can be coupled to it, as was shown in FIG. 6. The control information for the rendering device(s) may be in the form of Supplementary Enhancement Information (SEI messages) or Video Usability Information (VUI) parameter set fragments (not depicted). The parser (620) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (620) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (620) may perform entropy decoding/parsing operation on the video sequence received from the buffer (615), so to create symbols (621). The parser (620) may receive encoded data, and selectively decode particular symbols (621). Further, the parser (620) may determine whether the particular symbols (621) are to be provided to a Motion Compensation Prediction unit (653), a scaler/inverse transform unit (651), an Intra Prediction Unit (652), or a loop filter (656).

Reconstruction of the symbols (621) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (620). The flow of such subgroup control information between the parser (620) and the multiple units below is not depicted for clarity.

Beyond the functional blocks already mentioned, decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (651). The scaler/inverse transform unit (651) receives quantized transform coefficient as well as control information, including which transform to use, block size, quantization factor, quantization scaling matrices, etc. as symbol(s) (621) from the parser (620). It can output blocks comprising sample values, that can be input into aggregator (655).

In some cases, the output samples of the scaler/inverse transform (651) can pertain to an intra coded block; that is: a block that is not using predictive information from previously reconstructed pictures, but can use predictive information from previously reconstructed parts of the current picture. Such predictive information can be provided by an intra picture prediction unit (652). In some cases, the intra picture prediction unit (652) generates a block of the same size and shape of the block under reconstruction, using surrounding already reconstructed information fetched from the current (partly reconstructed) picture (656). The aggregator (655), in some cases, adds, on a per sample basis, the prediction information the intra prediction unit (652) has generated to the output sample information as provided by the scaler/inverse transform unit (651).

In other cases, the output samples of the scaler/inverse transform unit (651) can pertain to an inter coded, and potentially motion compensated block. In such a case, a Motion Compensation Prediction unit (653) can access reference picture memory (657) to fetch samples used for prediction. After motion compensating the fetched samples in accordance with the symbols (621) pertaining to the block, these samples can be added by the aggregator (655) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (621) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (655) can be subject to various loop filtering techniques in the loop filter unit (656). Video compression technologies can include in-loop filter technologies that are controlled by parameters included in the coded video bitstream and made available to the loop filter unit (656) as symbols (621) from the parser (620), but can also be responsive to meta-information obtained during the decoding of previous (in decoding order) parts of the coded picture or coded video sequence, as well as responsive to previously reconstructed and loop-filtered sample values.

The output of the loop filter unit (656) can be a sample stream that can be output to the render device (512) as well as stored in the reference picture memory (656) for use in future inter-picture prediction.

Certain coded pictures, once fully reconstructed, can be used as reference pictures for future prediction. Once a coded picture is fully reconstructed and the coded picture has been identified as a reference picture (by, for example, parser (620)), the current reference picture (656) can become part of the reference picture buffer (657), and a fresh current picture memory can be reallocated before commencing the reconstruction of the following coded picture.

The video decoder (510) may perform decoding operations according to a predetermined video compression technology that may be documented in a standard, such as H.265 HEVC. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (610) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 7:
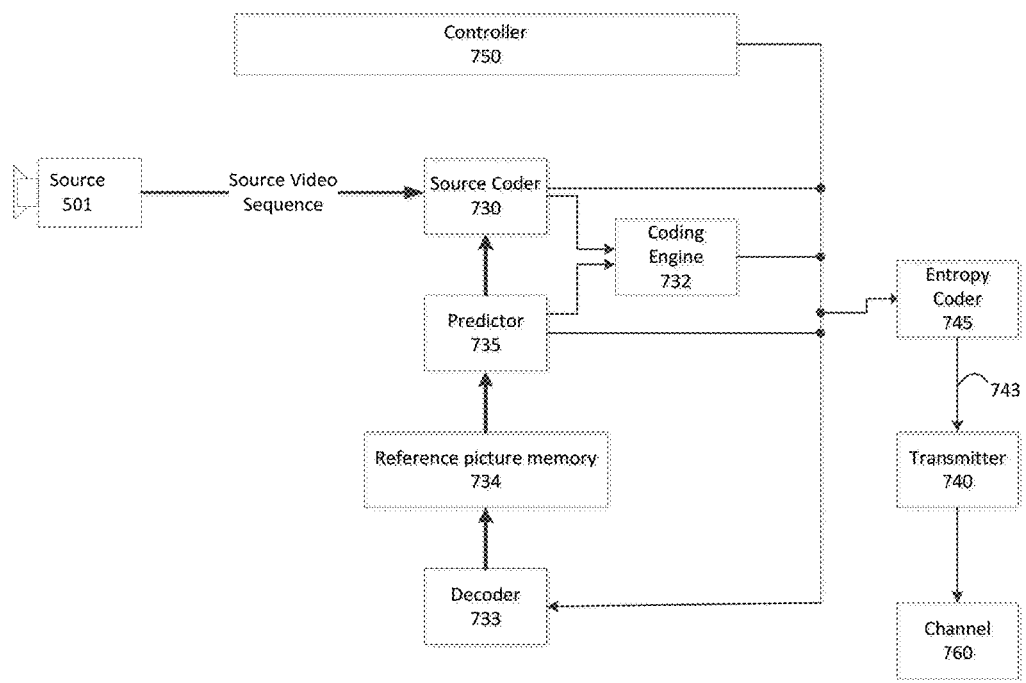
FIG. 7 is a block diagram of a video encoder in accordance with an embodiment.

FIG. 7 may be a functional block diagram of a video encoder (503) according to an embodiment of the present disclosure.

The encoder (503) may receive video samples from a video source (501) (that is not part of the encoder) that may capture video image(s) to be coded by the encoder (503).

The video source (501) may provide the source video sequence to be coded by the encoder (503) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (501) may be a storage device storing previously prepared video. In a videoconferencing system, the video source (503) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (503) may code and compress the pictures of the source video sequence into a coded video sequence (743) in real time or under any other time constraints as required by the application. Enforcing appropriate coding speed is one function of Controller (750). Controller (750) controls other functional units as described below and is functionally coupled to these units. The coupling is not depicted for clarity. Parameters set by controller can include rate control related parameters (picture skip, quantizer, lambda value of rate-distortion optimization techniques, etc.), picture size, group of pictures (GOP) layout, maximum motion vector search range, and so forth. A person skilled in the art can readily identify other functions of controller (750) as they may pertain to video encoder (503) optimized for a certain system design.

Some video encoders operate in what a person skilled in the art readily recognizes as a "coding loop." As an oversimplified description, a coding loop can consist of the encoding part of an encoder (730) ("source coder" henceforth) (responsible for creating symbols based on an input picture to be coded, and a reference picture(s)), and a (local) decoder (733) embedded in the encoder (503) that reconstructs the symbols to create the sample data that a (remote) decoder also would create (as any compression between symbols and coded video bit stream is lossless in the video compression technologies considered in the disclosed subject matter). That reconstructed sample stream is input to the reference picture memory (734). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (733) can be the same as of a "remote" decoder (510), which has already been described in detail above in conjunction with FIG. 5. Briefly referring also to FIG. 5, however, as symbols are available and en/decoding of symbols to a coded video sequence by entropy coder (745) and parser (620) can be lossless, the entropy decoding parts of decoder (510), including channel (612), receiver (610), buffer (615), and parser (620) may not be fully implemented in local decoder (733).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (730) may perform motion compensated predictive coding, which codes an input frame predictively with reference to one or more previously-coded frames from the video sequence that were designated as "reference frames." In this manner, the coding engine (732) codes differences between pixel blocks of an input frame and pixel blocks of reference frame(s) that may be selected as prediction reference(s) to the input frame.

The local video decoder (733) may decode coded video data of frames that may be designated as reference frames, based on symbols created by the source coder (730). Operations of the coding engine (732) may advantageously be lossy processes. When the coded video data may be decoded at a video decoder (not shown in FIG. 6), the reconstructed video sequence typically may be a replica of the source video sequence with some errors. The local video decoder (733) replicates decoding processes that may be performed by the video decoder on reference frames and may cause reconstructed reference frames to be stored in the reference picture cache (734). In this manner, the encoder (503) may store copies of reconstructed reference frames locally that have common content as the reconstructed reference frames that will be obtained by a far-end video decoder (absent transmission errors).

The predictor (735) may perform prediction searches for the coding engine (732). That is, for a new frame to be coded, the predictor (735) may search the reference picture memory (734) for sample data (as candidate reference pixel blocks) or certain metadata such as reference picture motion vectors, block shapes, and so on, that may serve as an appropriate prediction reference for the new pictures. The predictor (735) may operate on a sample block-by-pixel block basis to find appropriate prediction references. In some cases, as determined by search results obtained by the predictor (735), an input picture may have prediction references drawn from multiple reference pictures stored in the reference picture memory (734).

The controller (750) may manage coding operations of the video coder (730), including, for example, setting of parameters and subgroup parameters used for encoding the video data.

Output of all aforementioned functional units may be subjected to entropy coding in the entropy coder (745). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (740) may buffer the coded video sequence(s) as created by the entropy coder (745) to prepare it for transmission via a communication channel (760), which may be a hardware/software link to a storage device which would store the encoded video data. The transmitter (740) may merge coded video data from the video coder (730) with other data to be transmitted, for example, coded audio data and/or ancillary data streams (sources not shown).

The controller (750) may manage operation of the encoder (503). During coding, the controller (750) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (503) may perform coding operations according to a predetermined video coding technology or standard, such as H.265 HEVC. In its operation, the video coder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (740) may transmit additional data with the encoded video. The video coder (730) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

The present disclosure is directed to several block partitioning methods wherein motion information is considered during a tree split for video encoding. More specifically, the techniques in this disclosure relate to tree splitting methods for flexible tree structures based on motion field information. The techniques proposed in this disclosure can be applied to both homogenous and heterogenous derived motion fields.

Derived motion field of a block is defined as homogenous if the derived motion field is available for all sub-blocks in the block and all motion vectors in the derived motion field are similar, such as, the motion vectors share the same reference frame and the absolute differences among motion vectors are all below a certain threshold. The threshold may be signaled in bitstreams or predefined.

Derived motion field of a block is defined as heterogeneous if the derived motion field is available for all sub-blocks in the block and the motion vectors in the derived motion field are not similar, such as, at least one motion vector refers to a reference frame which is not referred by other motion vectors, or at least one absolute difference between two motion vectors in the field is larger than a signaled or predefined threshold.

Figure 8:
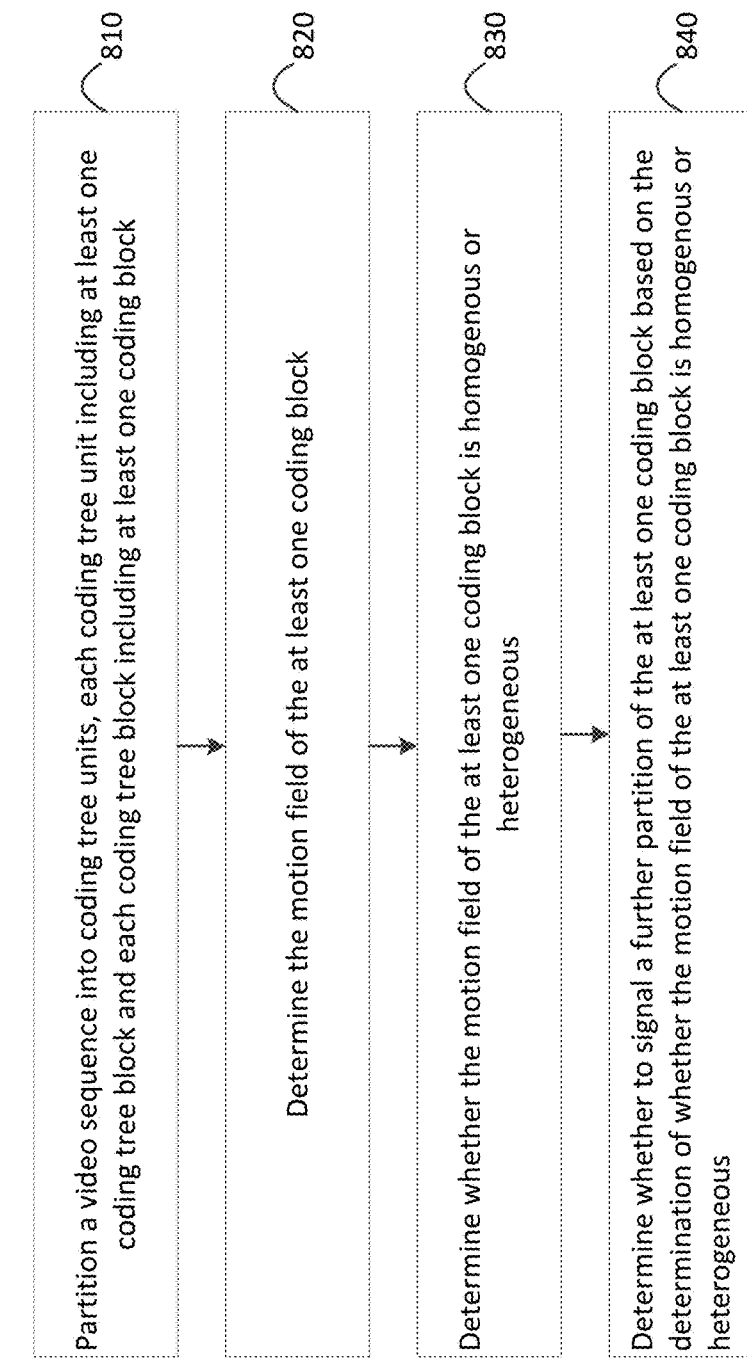
FIG. 8 is a flowchart of an example process for partitioning a coding block in accordance with an embodiment

FIG. 8 is a flowchart of an example process (800) for determining whether to signal a partition of at least one coding block based on a determination of whether the motion field of the at least one coding block is homogenous or heterogeneous. In some implementations, one or more process blocks of FIG. 8 may be performed by decoder (510). In some implementations, one or more process blocks of FIG. 8 may be performed by another device or a group of devices separate from or including decoder (510), such as encoder (503).

As shown in FIG. 8, process (800) may include partitioning a video sequence into coding tree units, each coding tree unit including at least one coding tree block and each coding tree block including at least one coding block (810).

As further shown in FIG. 8, process (800) may include determining the motion field of the at least one coding block (820).

As further shown in FIG. 8, process (800) may include determining whether the motion field of the at least one coding block is homogenous or heterogeneous (830).

As further shown in FIG. 8, process (800) may include determining whether to signal a further partition of the at least one coding block based on the determination of whether the motion field of the at least one coding block is homogenous or heterogeneous (840).

Although FIG. 8 shows example blocks of process (800), in some implementations, process (800) may include additional blocks, fewer blocks, different blocks, or differently arranged blocks than those depicted in FIG. 8. Additionally, or alternatively, two or more of the blocks of process (800) may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (904), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (904), or joystick (905), but there can also be tactile feedback devices that do not serve as input devices), audio output devices (such as: speakers 909, headphones (not depicted)), visual output devices (such as screens 910 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example universal serial bus (USB) ports of the computer system (900); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) 942, specialized programmable processing units in the form of Field Programmable Gate Areas (FPGA) (943), hardware accelerators for certain tasks (944), and so forth. These devices, along with Read-only memory (ROM)) 945), Random-access memory (RAM) (946), internal mass storage such as internal non-user accessible hard drives, solid-state drives (SSDs), and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus 949. Architectures for a peripheral bus include peripheral component interconnect (PCI), USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

ACRONYMS

High Efficiency Video Coding (HEVC)
Video Coding Experts Group (VCEG)
ITU Telecommunication Standardization Sector (ITU-T)
International Telecommunication Union (ITU)
ISO/IEC MPEG (JTC 1/SC 29/WG 11)
International Organization for Standardization (ISO)
International Electrotechnical Commission (IEC)
H.265/High Efficiency Video Coding (HEVC)
Joint Video Exploration Team (JVET)
Joint Exploration Model (JEM)
Coding Tree Unit (CTU)
Coding Units (CUs) (also known as coding blocks)
Prediction Units (PUs)
Transform Units (TUs)
Quad-tree-Binary-Tree (QTBT)
Multi-Type-Tree (MTT)
Region Tree (RT)
Prediction Tree (PT)
Asymmetric Coding Units (ACU)
Temporal Motion Vector Prediction (TMVP)
Decoded Picture Buffer (DPB)
Context-Adaptive Binary Arithmetic Coding (CABAC)
Versatile Video Coding (VVC)
Supplementary Enhancement Information (SEI)
Video Usability Information (VUI)
Groups of Pictures (GOPs)
Hypothetical Reference Decoder (HRD)
Signal-to-Noise Ratio (SNR)
Supplementary Enhancement Information (SEI)
Visual Usability Information (VUI)
Central Processing Units (CPUs)
Graphics Processing Units (GPUs)
Read-Only Memory (ROM)
Random-Access Memory (RAM)

The invention claimed is:

1. A method for encoding or decoding a video sequence, the method comprising:
    partitioning the video sequence into coding tree units, each coding tree unit including at least one coding tree block and each coding tree block including at least one coding block,
    determining the motion field of the at least one coding block,
    determining whether the motion field of the at least one coding block is homogenous or heterogeneous, and
    determining whether to signal a further partition of the at least one coding block based on the determination of whether the motion field of the at least one coding block is homogenous or heterogeneous.

2. The method of claim 1, further comprising:
    partitioning the at least one coding block when it is determined that the motion field is heterogeneous,
    wherein the motion field is determined to be homogeneous if a derived motion field is available for all sub-blocks of the at least one coding block and all motion vectors in the derived motion field are similar, such that the motion vectors share the same reference frame and the absolute differences among the motion vectors are all below a certain threshold which may be signaled in bit stream or predefined, and
    wherein the motion field is determined to be heterogeneous if a derived motion field is available for all sub-blocks of the at least one coding block and motion vectors in the derived motion field are not similar, such that at least one motion vector refers to a reference frame which is not referred to by other motion vectors, or at least one absolute difference between two motion vectors in the motion field is larger than a signaled or predefined threshold.

3. The method of claim 2, wherein
partitioning of the at least one coding block is not signaled in bit stream.

4. The method of claim 1, further comprising:
leaving as non-partitioned the at least one coding block when it is determined that the motion field is homogeneous,
wherein the motion field is determined to be homogeneous if a derived motion field is available for all sub-blocks of the at least one coding block and all motion vectors in the derived motion field are similar, such that the motion vectors share the same reference frame and the absolute differences among the motion vectors are all below a certain threshold which may be signaled in bit stream or predefined, and
wherein the motion field is determined to be heterogeneous if a derived motion field is available for all sub-blocks of the at least one coding block and motion vectors in the derived motion field are not similar, such that at least one motion vector refers to a reference frame which is not referred to by other motion vectors, or at least one absolute difference between two motion vectors in the motion field is larger than a signaled or predefined threshold.

5. The method of claim 4, wherein
non-partitioning of the at least one coding block is not signaled in bit stream.

6. The method of claim 1, further comprising:
partitioning the at least one coding block using a tree type split such that sub-blocks obtained via the partitioning have the most homogeneous motion field among all available splitting types,
wherein information on how to split the current block is derived.

7. The method of claim 1, further comprising:
determining split types for partitioning the at least one coding block which result in relatively more heterogeneous motion fields than other available splitting types, and
leaving as non-partitioned the at least one coding block with the split types which result in relatively more heterogeneous motion fields so as to reduce signaling costs.

8. The method of claim 1, wherein,
the determining of whether to signal the further partition the at least one coding block is implemented on a condition that a size of one of the at least one coding block is larger than a predetermined threshold.

9. The method of claim 1, further comprising:
determining the size of the coding tree units based on the motion field.

10. The method of claim 1, further comprising:
deriving the maximum depth of a further partition of the at least one coding block based on a ranking of how homogeneous/heterogeneous the motion field is for the coding block.

11. A device for encoding or decoding a video sequence, the device comprising:
at least one memory configured to store program code;
at least one processor configured to read the program code and operate as instructed by the program code, the program code including:
first partitioning code configured to cause the at least one processor to partition the video sequence into coding tree units, each coding tree unit including at least one coding tree block and each coding tree block including at least one coding block,
first determining code configured to cause the at least one processor to determine the motion field of the at least one coding block,
second determining code configured to cause the at least one processor to determine whether the motion field of the at least one coding block is homogenous or heterogeneous, and
third determining code configured to cause the at least one processor to determine whether to signal a further partition of the at least one coding block based on the determination of whether the motion field of the at least one coding block is homogenous or heterogeneous.

12. The device of claim 11, further comprising:
second partitioning code configured to cause the at least one processor to partition the at least one coding block when it is determined that the motion field is heterogeneous,
wherein the second determining code is configured to cause the at least one processor to determine whether the motion field of the at least one coding block is homogenous if a derived motion field is available for all sub-blocks of the at least one coding block and all motion vectors in the derived motion field are similar, such that the motion vectors share the same reference frame and the absolute differences among the motion vectors are all below a certain threshold which may be signaled in bit stream or predefined, and
wherein the second determining code is configured to cause the at least one processor to determine whether the motion field of the at least one coding block is heterogeneous if a derived motion field is available for all sub-blocks of the at least one coding block and motion vectors in the derived motion field are not similar, such that at least one motion vector refers to a reference frame which is not referred to by other motion vectors, or at least one absolute difference between two motion vectors in the motion field is larger than a signaled or predefined threshold.

13. The device of claim 12, wherein
the second partitioning code is configured to cause the at least one processor to not signal in bit stream the partitioning of the at least one coding block.

14. The device of claim 11, wherein
the third determining code is configured to cause the at least one processor to signal a non-partitioning of the at least one coding block when it is determined that the motion field is homogeneous,
wherein the second determining code is configured to cause the at least one processor to determine whether the motion field of the at least one coding block is homogenous if a derived motion field is available for all sub-blocks of the at least one coding block and all motion vectors in the derived motion field are similar, such that the motion vectors share the same reference frame and the absolute differences among the motion vectors are all below a certain threshold which may be signaled in bit stream or predefined, and
wherein the second determining code is configured to cause the at least one processor to determine whether the motion field of the at least one coding block is heterogeneous if a derived motion field is available for all sub-blocks of the at least one coding block and motion vectors in the derived motion field are not similar, such that at least one motion vector refers to a reference frame which is not referred to by other motion vectors, or at least one absolute difference between two motion vectors in the motion field is larger than a signaled or predefined threshold.

15. The device of claim 11, further comprising:
second partitioning code configured to cause the at least one processor to partition the at least one coding block using a tree type split such that sub-blocks obtained via the second partitioning code have the most homogeneous motion field among all available splitting types, wherein information on how to split the current block is derived.

16. The device of claim 11, further comprising:
fourth determining code configured to cause the at least one processor to determine split types for partitioning the at least one coding block which result in relatively more heterogeneous motion fields than other available splitting types, and
second partitioning code configured to cause the at least one processor to not partition the at least one coding block with the split types which result in relatively more heterogeneous motion fields so as to reduce signaling costs.

17. The device of claim 11, further comprising:
fourth determining code configured to cause the at least one processor to determine whether to signal the further partition of the at least one coding block when the at least one coding block is larger than a predetermined threshold.

18. The device of claim 11, further comprising:
first deriving code configured to cause the at least one processor to derive the maximum depth of a further partition of the at least one coding block based on a ranking of how homogeneous/heterogeneous the motion field is for the coding block.

19. A non-transitory computer-readable medium storing instructions, the instructions comprising: one or more instructions that, when executed by one or more processors of a device, cause the one or more processors to:
partition a video sequence into coding tree units, each coding tree unit including at least one coding tree block and each coding tree block including at least one coding block,
determine the motion field of the at least one coding block,
determine whether the motion field of the at least one coding block is homogenous or heterogeneous, and
determine whether to signal a further partition of the at least one coding block based on the determination of whether the motion field of the at least one coding block is homogenous or heterogeneous.

20. The method of claim 1, further comprising:
determining a CABAC context for entropy coding flags signaled for indicating the further partitioning of the at least one coding block based on the determination of whether the motion field of the at least one coding block is homogenous or heterogeneous,
wherein the motion field is determined to be homogeneous if a derived motion field is available for all sub-blocks of the at least one coding block and all motion vectors in the derived motion field are similar, such that the motion vectors share the same reference frame and the absolute differences among the motion vectors are all below a certain threshold which may be signaled in bit stream or predefined, and
wherein the motion field is determined to be heterogeneous if a derived motion field is available for all sub-blocks of the at least one coding block and motion vectors in the derived motion field are not similar, such that at least one motion vector refers to a reference frame which is not referred to by other motion vectors, or at least one absolute difference between two motion vectors in the motion field is larger than a signaled or predefined threshold.

* * * * *